Patented Jan. 25, 1938

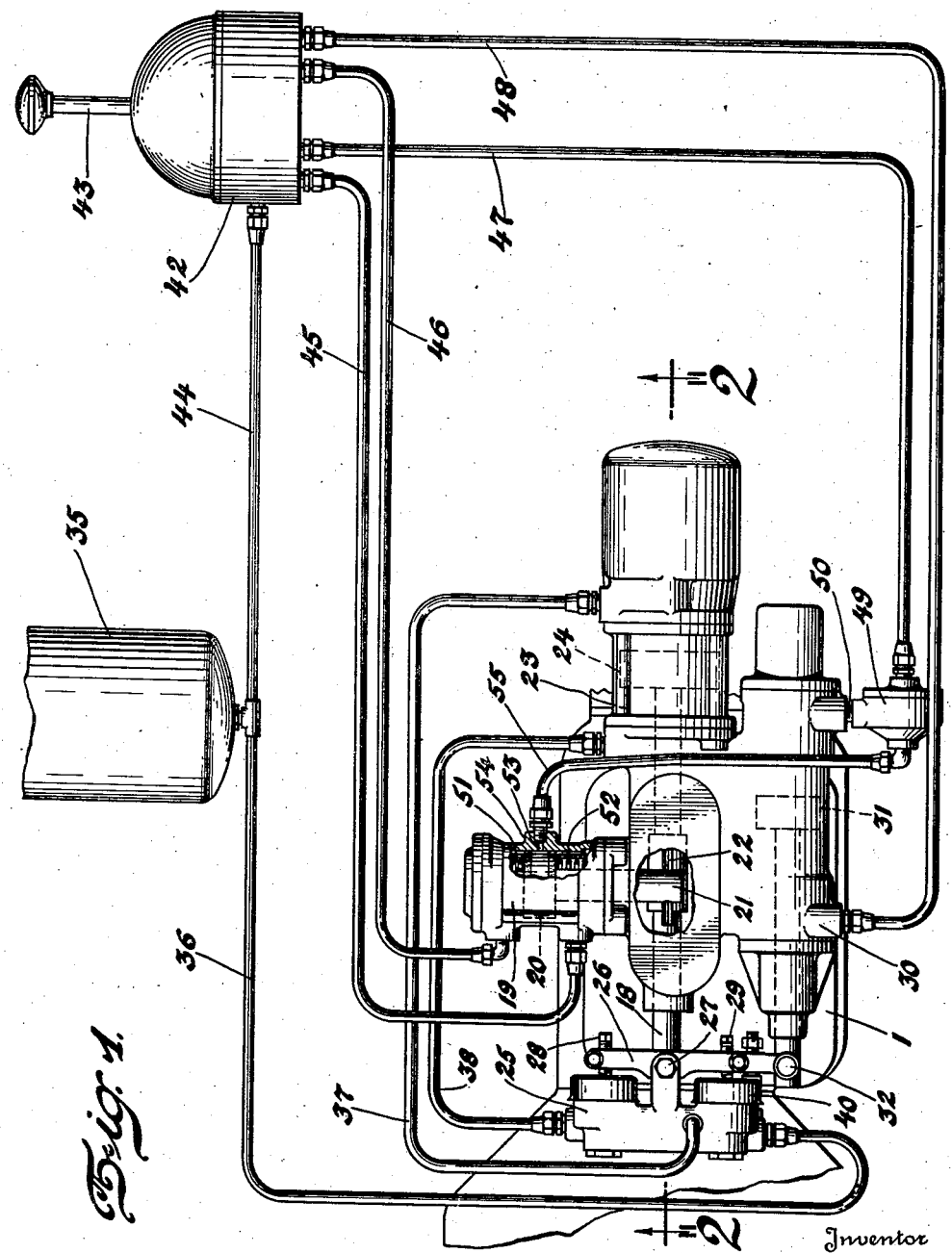

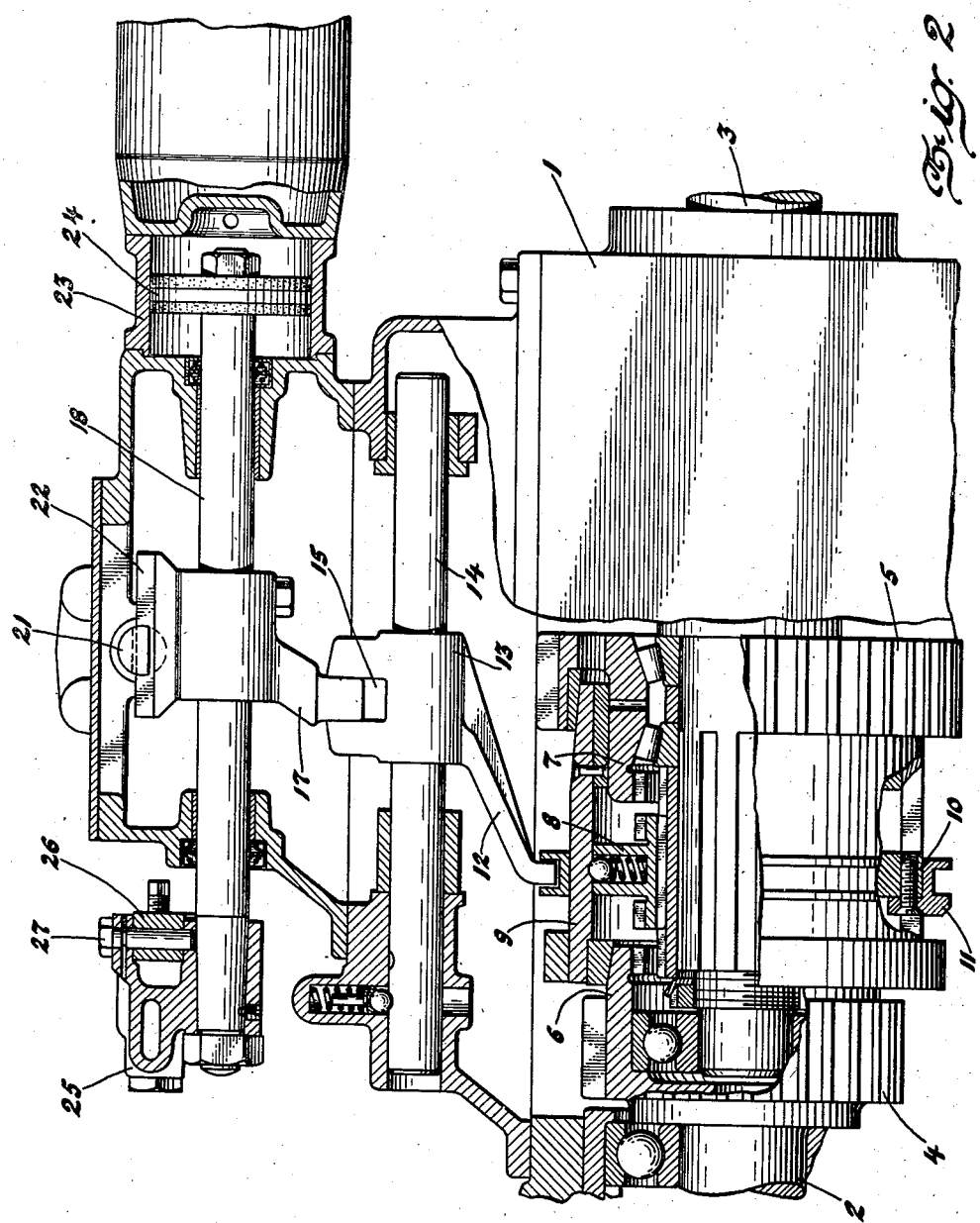

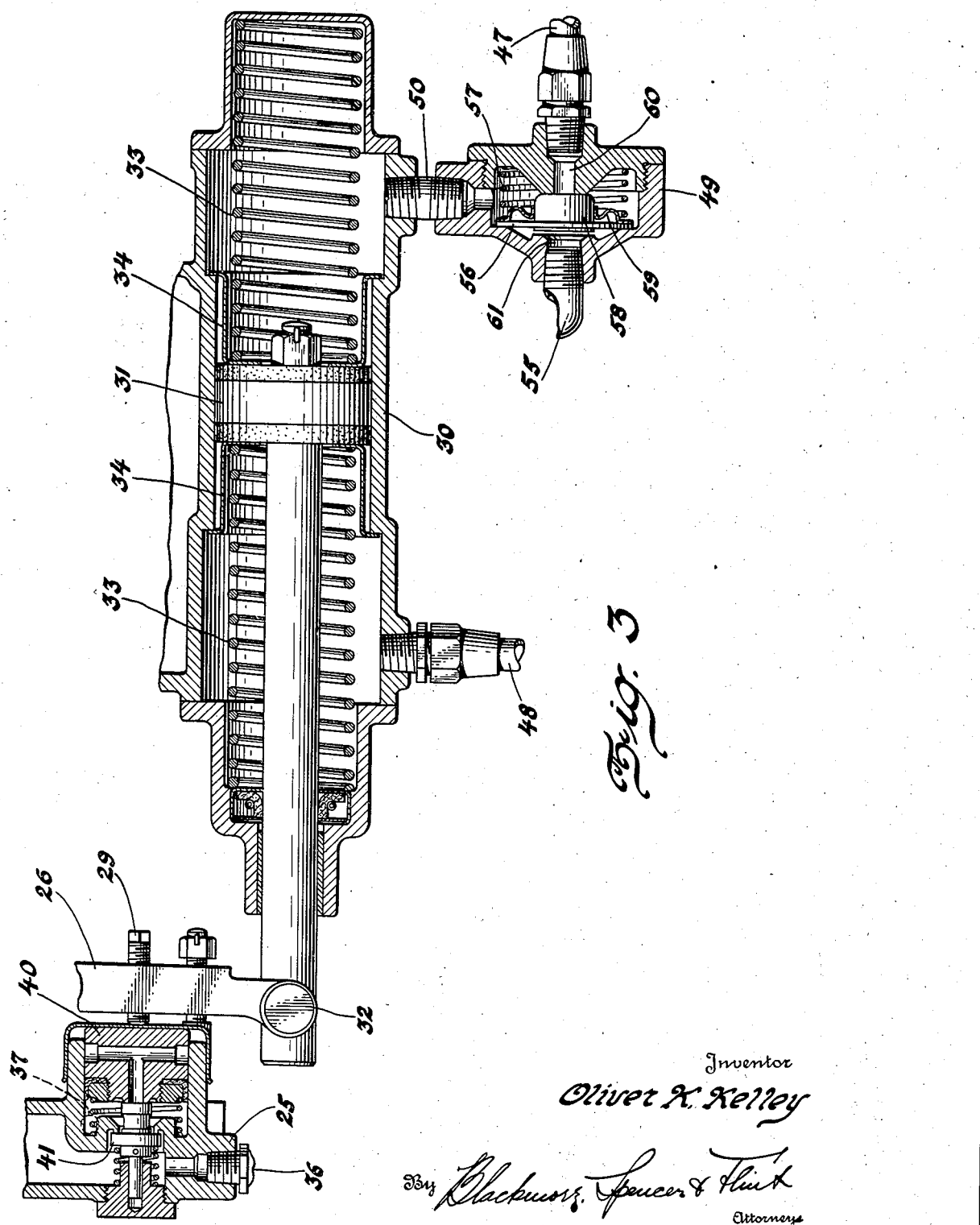

2,106,608

UNITED STATES PATENT OFFICE 2,106,608

POWER SHIFT TRANSMISSION

Oliver K. Kelley, Pontiac, Mich., assignor, by mesne assignments, to Yellow Truck and Coach Manufacturing Company, Pontiac, Mich., a corporation of Maine Application February 24, 1936, Serial No. 65,221

13 Claims. (Cl. 74—364)

This invention has to do with power shifted change speed gear transmissions for motor vehicles.

In the conventional manually shifted automobile transmission, a hand lever extends upwardly from the gear box to a point within convenient reach of the car driver, and a side movement of the lever selects one of a series of shift rails and then a forward or rearward movement shifts the rails for effecting a given speed setting. Where the transmission is located at a point remote from the driver's station, as in the case of a rearwardly mounted power plant in a bus, a fluid pressure system is used for transmitting hand lever movement, or more properly speaking, for setting the gears in accordance with the position to which the hand lever is moved.

One of the most popular of such systems is that shown in French Patent No. 781,511, issued to Bendix Westinghouse Automotive Air Brake Company, wherein the hand lever controls a series of valves from which air under pressure is fed through conduits to pressure responsive devices associated with the transmission unit for effecting speed changes. One of the pressure responsive devices acts to move a selector arm transversely of the shift rails into selective engagement with the rails and the other pressure responsive device acts to shift a selected rail axially.

It is to a transmission of this sort that the present invention relates and the object of the invention is to improve the operation of the shifter system and insure the transmission of drive through the gear box in the speed setting to which the hand lever is positioned.

For a better understanding of the invention it is pointed out that the mentioned air shift system as heretofore constructed, employs air under pressure to rock the selector rail and swing with it a lever to engage any one of three gear shift rails and to shift at substantially the same time, the selector rail to carry along the selected shift rail. Depending upon which shift rail is engaged by the selector rail, movement in one direction effects first, third and reverse speed settings, respectively, and shifting the selector rail in the opposite direction with the selector arm engaging the intermediate shift rail, effects second speed setting.

The objection to the system is that in changing from one speed setting to another, except for a change which involves second speed setting, the operator must move the hand lever to neutral position and then delay its movement into the next position a sufficient interval to allow complete return of the gear parts from the previous setting. Attempts to shift rapidly may prevent the shifter arm moving free of the shift rail controlling the previous setting and the reapplication of power returns the parts to the previous setting.

There is no trouble regarding successive shifts which include the second or intermediate speed setting, inasmuch as the successive movements of the shift rail then is alternately in opposite directions. The real danger involved through careless or inexperienced handling, is most likely to result in changing between reverse and low speed settings. In other words, if the vehicle has been running either forward or backward and it is desired to change the direction of travel, unless care is exercised in operating the hand lever controlled valving, travel in the previous direction may be resumed despite a change in hand lever setting.

Accordingly, it is proposed, as regards shifting into reverse and first or low forward speeds, to interrelate the action of the pressure responsive devices in a way that shifting cannot occur until after rail selection is complete. This will make the operation fool-proof and not only will there be eliminated the possibility of injury and damage because of a vehicle movement in a direction not intended, but in addition the operator will be relieved of care and mental strain.

So much of the system as is necessary for an understanding of the invention is illustrated in the accompanying drawings, wherein Figure 1 is a more or less diagrammatic view of the operating mechanism and the assembly of pressure lines; Figure 2 is a section taken on line 2—2 of Figure 1 and Figure 3 is a sectional view to illustrate a part of the operating mechanism in detail.

In the drawings the reference numeral 1 indicates a gear box to contain variable speed gearing of any conventional type and which transmits the drive from the engine to the road wheels. A portion of the gearing is illustrated in Figure 2 where the input and output shafts are indicated at 2 and 3, respectively. The end of the input shaft carries a gear 4 adapted for constant mesh engagement with a gear on a countershaft, not shown. This countershaft, as will be understood, carries a series of spaced gear elements each in constant mesh engagement with cooperating gearing adapted for drive engagement with the output shaft. The second speed gear of the train is indicated at 5 as being mounted upon suitable bearings on the output shaft in spaced relation with the gear element 4. Tubular projections 6 and 7 on the gears 4 and 5, respectively, are each provided with internal clutch teeth adapted for independent engagement with external teeth on a clutch slider collar 8 which is keyed to the output shaft. In Figure 2 the slider is shown in an intermediate or neutral position. Its movement toward the right will clutch it with the extension 7 to effect second speed drive while its movement toward the left will engage the extension 6 for direct drive relation.

Associated with the slider 8 is a sleeve 9 which carries speed synchronizing cone clutches at opposite ends for engagement with cooperating conical surfaces on the gear elements 4 and 5, whereby equalization of speeds is effected to facilitate engagement of the clutch teeth. Secured to the slider 8 at circumferentially spaced points by means of studs as shown at 10, is a collar 11 having an annular groove therein to receive a shifter fork 12, the head 13 of which is fixed to a shift rail 14. Additional shift rail and fork assemblies arranged side by side are provided for reverse and first or low speed gearing and each shifter fork head will be provided with a transverse groove as shown at 15 to receive the end of a shifter arm 17 on the selector rail 18. In the neutral position of the several shift rails the notches 15 will be in transverse alinement to permit the free passage therethrough of the swinging arm 17 into engagement with any one of the several shift rails.

Axial movement of the selector rod 18 acts through the selector arm 17 to move the shift rail engaged thereby to control the setting of the change speed gearing. The rocking and shifting of the selector rail 18 is effected through pressure responsive devices. One of these devices includes as an assembly, a cylinder 19 and a piston 20, the piston having a rod 21 extending therefrom for sliding keyed engagement with a feather 22 formed as a part of the selector arm 17. The other pressure responsive device includes a pressure cylinder 23 in which is slidable a piston 24 mounted on one end of the selector rail 18.

The other end of the selector rail 18 carries a hollow valve casing 25 and a lever 26 is pivoted thereto by a stud 27 to control the action of a pair of valves located on opposite sides of the pivot connection. Set screws 28 and 29 on the lever are provided for engaging the valve elements. This mechanism forms part of a well known follow-up system controlling the flow of air under pressure to the piston cylinder 23. It includes in addition, a piston cylinder 30 enclosing a piston 31 which is connected as at 32 with the lever 26. Coil springs 33—33 on opposite sides of the piston tend to maintain a centered relation of the parts and each spring seats on a slidable abutment 34 which limits the expansion of the spring so that the springs act in opposition to each other only when the piston is in centered position.

Air under pressure introduced into the cylinder 30 on either side of the piston 31 will swing the lever 26 about its fulcrum connection 27 with the shift rail 18 and open one or the other of the valves associated with the housing 25. This will allow flow from a storage tank 35 or other suitable source of air under pressure, through a conduit 36 connected with the interior of the hollow valve casing 25 and through one or the other of the conduits 37—38 which lead to the piston cylinder 23 on opposite sides of the piston 24. The response of the piston 24 to pressure shifts the rail 18 and necessarily carries with it the valve casing and the lever 26 and the movement of the fulcrum point 27 for the lever 26, necessitates continued movement of the piston 31 to keep the valve open. Each of the follow-up valves may be constructed as shown in the detail view, Figure 3, where the set screw 29 is shown in engagement with a piston 40 slidable within an air chamber which communicates with the conduit 37, and the inward movement of the piston unseats a valve disc 41 for the passage of air from the hollow interior of the casing 25 to which the pressure line 36 leads.

The air shift system as thus far described is substantially that placed on the market by Bendix Westinghouse and which includes in addition a multiple valve indicated in the drawings at 42 controlled by a hand lever 43 for supplying air under pressure from the tank 35 through a conduit 44 to several pressure lines indicated at 45, 46, 47, and 48. The valve is so constructed as to exhaust any pressure line which is not in communication with the pressure conduit 44. Whereas in the conventional design air is fed through the several conduits 45—48 in various combinations according to the speed setting desired, it is here proposed for any one speed setting, to use but one pressure line. For identification, the conduit 45 controls first or low speed setting, the conduit 46 controls reverse speed setting, the conduit 47 controls third or high speed setting and the conduit 48 controls second or intermediate speed setting.

For second speed setting the shift lever 43 is moved to proper position to flow air under pressure through the line 48 and into the left-hand end of the piston cylinder 30 as seen in the drawings. The movement of the piston 31 toward the right permits air flow through the conduit 38 and into the left-hand end of the piston cylinder 23 which correspondingly shifts the rail 14 to engage the clutch teeth of the parts 7 and 8. For third speed setting air under pressure flows through the line 47 to the interior of a valve casing 49 to be later described, and which is coupled by a nipple 50 to the right-hand end of the pressure cylinder 30. This moves the piston to the left and actuates the follow-up valve to flow pressure through the conduit 37 into the right-hand end of the pressure cylinder 23 and correspondingly move the piston 24 and with it the associated parts to effect high speed setting.

During the second speed and third speed operation both sides of the selector cylinder 19 are exhausted and the piston 20 is held in an intermediate position by centering springs 51 and 52, whereby the selector finger 17 engages with the intermediate shift rail 14. Coming now to the reverse and low speed settings and taking these up in order, the flow of air under pressure through the line 46 causes the piston 20 to be moved toward one limit of its travel and by reason of the connection between the piston rod 21 and the selector arm 17, the rail 18 is rocked about its axis and the selector arm 17 swings through the alined slots 15 into engagement with the reverse speed selector rail. As the selecting operation reaches completion the piston 20 uncovers a port 53 in the boss 54 formed on the piston cylinder 19, to allow the flow of air under pressure from the piston cylinder through the conduit 55 to the valve casing 49 and into the cylinder 30. Thereupon the response of the piston 31 actuates the follow-up valve to flow air through the conduit 37 for moving the piston 24 and with it the reverse speed shift rail. In a similar manner, first speed setting is effected when air flow through the conduit 45 moves the piston 20 toward the other limit of travel to first swing the selector arm 17 into engagement with the first speed shift rail and thereafter uncover the port 53 to allow flow through the conduit 55 into the right-hand end of the piston cylinder 30 for again actuating the follow-up valve which controls air flow through the conduit 37.

Thus it will be seen that the direction of movement of the several shift rails for first, reverse and third speed settings is the same, but inasmuch as the shift into first and reverse speed settings cannot be made until after selection is complete, proper engagement of the gearing will result without the need for special care on the part of the operator in his manipulation of the hand lever 43.

The valve casing 49 is provided to insure proper exhaust and to direct air under pressure to the cylinder 30 upon its supply through the independent lines 47 and 55. As seen in Figure 3 the hollow casing encloses a plate valve 56 held on its seat by a coil spring 57 and provided centrally thereof with a slidable plug 58. A flexible diaphragm 59 prevents leakage between the plate 56 and its plug 58. The plug is adapted to seat over either of the alined ports 60 and 61 in the opposite sides of the casing 49 and with which communicate, respectively, the pressure lines 47 and 55. Upon the application of air under pressure through the line 55, the plug 58 is moved toward the right and seats over the port 60 to prevent the escape of air through the vented conduit 47. It also moves the plate 56 against the spring 57 and the air flows from the casing 49 through the nipple 50. Upon the relief of pressure through the line 55, the spring 57 restores the plate 56 and eliminates reverse flow of air through the line 55 toward the piston cylinder 19. Any air pressure remaining will move the plug 58 away from the port 60 for exhausting the cylinder 30. On the other hand, when air under pressure is supplied through the line 47 it seats the plug 58 over the port 61 which in cooperation with the plate 56 provides a double guard against leakage of air through the conduit 55. The exhaust of air from the cylinder 30 occurs as before described.

I claim:

1. In a power shift transmission of the characted described, a series of shift rails, means selectively engageable with the rails to shift the same, a pair of pressure responsive devices associated with the selector means to operate the same, a source of fluid pressure, means communicating one of said devices with the pressure source and means controlled by a predetermined response of the last mentioned device to communicate the other device in series relation therewith.

2. In a power shift system, a rockable and shiftable selector rail, a pressure responsive device to shift the rail, a piston connected with the rail to rock the same, a cylinder slidably containing said piston, means on opposite sides of the piston to introduce fluid under pressure into the cylinder to move the piston in one direction or the other from a centered position and means communicating the pressure responsive device with the cylinder after the piston has moved in either direction from said centered position.

3. Gear shift mechanism including a rockable and shiftable speed selector rail, a pressure responsive device for shifting said rail, a pressure responsive device for rocking said rail, means for supplying fluid under pressure to the last mentioned device to rock said rail and means controlled by the action of said device and effective after a predetermined response, to supply fluid under pressure serially from said device to the first mentioned pressure responsive device.

4. The combination with gear shift rail selector mechanism and rail shifter mechanism adapted for action in sequence, of power supply means for operating said mechanisms, a conduit connecting said mechanisms for the flow of power from one to the other, means for connecting the power supply means with one of said mechanisms and means dependent upon the response of said mechanism to open said conduit.

5. In a power shift transmission, a movable shifter element, a pressure responsive device to move the element in one direction, pressure responsive means to move the element in a direction transverse to the direction of the first mentioned movement, including a piston and cylinder assembly, means to introduce fluid under pressure into the cylinder on opposite sides selectively of the piston, a port in the cylinder adapted to be closed by the piston when the piston is in an intermediate position in its range of movement and to be uncovered and opened to the pressure side of the cylinder when the piston reaches either limit of its movement, and a fluid pressure conduit connecting said port with the pressure responsive device for the sequential movement of said shifter element in angularly related directions.

6. In a power shift transmission having a series of shift rails, a selector rail adapted for transverse movement into selective engagement with said shift rails and for axial movement with a selected rail, a pair of pressure responsive devices associated with the selector rail to impart the respective movements thereto, a fluid pressure conduit connecting said devices with each other, means to supply one of said devices with fluid under pressure and means active after a predetermined response of said device to open said conduit.

7. In a power shift transmission having a series of shift rails, a selector rail adapted for transverse movement into selective engagement with said shift rails and for axial movement with a selected rail, a pair of pressure responsive devices associated with the selector rail to impart the respective movements thereto, means to supply pressure fluid to the device for effecting transverse movement of the selector rail, means effective after a predetermined response of said device to supply presure fluid therefrom to the other device, additional means to supply pressure fluid to the last mentioned device independent of the first means and a pressure actuated valve associated with both supply means to said last mentioned device and active when fluid pressure is supplied from either of the two supply means, to close the other thereof.

8. In a power shift transmission having a series of shift rails, a selector rail adapted for transverse movement into selective engagement with said shift rails and for axial movement with a selected rail, a pair of pressure responsive devices associated with the selector rail to impart the respective movements thereto, means to supply pressure fluid to said devices including a series of conduits and a valve element comprising a casing having a hollow chamber communicating with one of said devices, a pair of spaced valve seats, each associated with separate pressure fluid conduits and a valve movable within said chamber and adapted in response to pressure flow in one conduit to be seated on the seat associated with the other conduit.

9. In a fluid pressure controlled variable speed transmission, a source of fluid pressure, a fluid pressure operated shifter mechanism and a fluid pressure operated selector mechanism adapted for series connection with the fluid pressure source, said fluid pressure selector mechanism including a piston and a cylinder and the cylinder having a port in the wall thereof adapted to be covered by the piston in one position thereof and to be uncovered upon movement of the piston under the application of fluid pressure to the cylinder, and a conduit connecting said port with the shifter mechanism for flow of pressure fluid from the pressure side of the piston after the port is uncovered.

10. In a power shift transmission, a source of power, a power actuated selector mechanism adapted for direct connection with the power source, a power actuated shifter mechanism, means for connecting the shifter mechanism directly with the power source independently of the power connection to the selector mechanism, and other means for connecting the shifter mechanism with the power source in series relation with the selector mechanism after a predetermined response of the selector mechanism.

11. In a power shift transmission, a source of power, power actuated selector and shifter mechanisms adapted for serial connection with the power source, said selector mechanism being interposed in the connection between the shifter mechanism and the power source and including a member movable upon the application of power thereto and means operable after a predetermined relative movement of said member to feed power from the power source serially through the selector mechanism to the shifter mechanism.

12. In a control mechanism for a vehicle gearing apparatus having a selector and shifter member normally occupying a neutral position, means for mounting said member adjacent said apparatus, a fluid power operated device for oscillating said member in either of opposite directions to select a desired gear ratio, a separate fluid operated device for shifting said member to establish the selected gear ratio, manually operable means to control the application of fluid pressure to said first device, and means controlled by the operation of said first device for establishing communication between said second device and said manually operable means whereby fluid pressure is conducted to the second device.

13. In a control mechanism for a vehicle gearing apparatus having a selector and shifter member normally occupying a neutral position, means for mounting said member adjacent said apparatus, a fluid power operated device for oscillating said member in either of opposite directions to select a desired gear ratio, a separate fluid operated device for shifting said member to establish the selected gear ratio, manually operable means to control the application of fluid pressure to said first device, and means rendered operable by movement of said first device for establishing direct communication between said second device and said manually operable means whereby fluid pressure is conducted to the second device.

OLIVER K. KELLEY.